Figure 1:
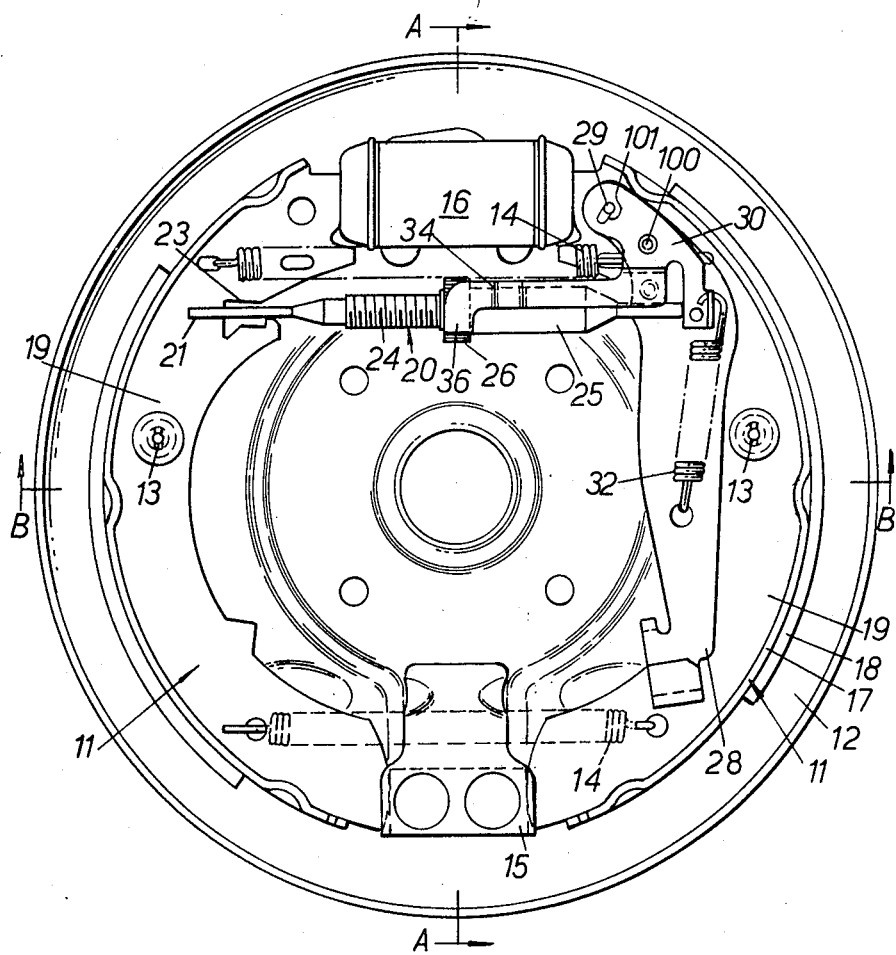

United States Patent [19]
Rath

[11] 3,717,227
[45] Feb. 20, 1973

[54] MECHANICAL COUPLINGS

[75] Inventor: Heinrich Bernhard Rath, 54 Koblenz-Lutzel, Germany

[73] Assignee: Girling Limited, Birmingham, England

[22] Filed: Jan. 28, 1971

[21] Appl. No.: 110,577

[30] Foreign Application Priority Data

Jan. 30, 1970 Great Britain..........................4,456/70

[52] U.S. Cl......188/79.5 P, 188/106 A, 188/196 BA
[51] Int. Cl..............................................F16d 65/56
[58] Field of Search........188/79.5 B, 79.5 K, 79.5 P, 188/79.5 GC, 79.5 GT, 106 A, 196 BA

[56] References Cited

UNITED STATES PATENTS

| | | | |
|---|---|---|---|
| 3,010,544 | 11/1961 | Dahle et al.................... | 188/79.5 GC |
| 3,017,962 | 1/1962 | Ingres............................ | 188/79.5 GC |
| 3,213,970 | 10/1965 | Dombeck et al.............. | 188/79.5 GC |
| 3,554,332 | 1/1971 | Harrison....................... | 188/79.5 GC |

FOREIGN PATENTS OR APPLICATIONS 1,095,043  12/1967  Great Britain...................188/79.5 P Primary Examiner—Duane A. Reger
Attorney—Scrivener, Parker, Scrivener & Clarke

[57] ABSTRACT

A brake operating mechanism has a variable length strut between the shoes. The strut is adjusted in length by a pawl and ratchet. A pawl carrying arm is moved to engage the ratchet by a rocker-arm pivotally connected between the strut and either one of the brake shoes or a lever of an auxiliary brake actuating means pivotal to said one of the brake shoes.

15 Claims, 5 Drawing Figures

MECHANICAL COUPLINGS

The present invention concerns a mechanical coupling and particularly concerns the operating mechanism for an internal shoe drum brake.

In our British Pat. specification No. 1,199,191 there is disclosed an internal shoe drum brake including a pair of brake shoes which can be expanded against the action of shoe return spring means alternatively by power actuated service brake means or by manually actuated auxiliary brake means, a strut of adjustable length which transmits manually applied loads between shoes but is relieved of load upon actuation of the service brake means, the strut comprising a pair of relatively rotatable members screw threaded together, and pawl and ratchet means for effecting relative rotation of the members to lengthen the strut in response to excessive travel of the brake shoes upon break actuation, wherein such relative rotation is effected when the service brake is operated to relieve the load imposed on the strut by the return spring means.

The present invention provides an improvement or modification of the structure described in British Pat. No. 1,199,191.

According to the present invention there is provided an operating mechanism for a mechanical coupling such as an internal shoe drum brake comprising
a. a mounting,
b. a pair of opposed arcuate friction elements carried from said mounting,
c. means for biassing the friction elements radially inwardly towards each other,
d. a torque absorbing means on said mounting and disposed between one pair of adjoining ends of the friction elements,
e. an actuator on said mounting and disposed between the other pair of adjoining ends of the friction elements,
f. a strut disposed between the two elements to establish a controlled spacing between the elements, said strut comprising screw engaged parts, one of which has a ratchet wheel rotating means so arranged as to cause elongation of said strut,
g. a rocker arm having one end pivotal but located in the longitudinal direction of said strut relative to the strut and the other end pivotal but located for movement with one of said elements, and
h. an arm movable by said rocker arm and carrying a pawl for engagement with the ratchet wheel so arranged as to cause rotation of the ratchet wheel when the actuator is operated and the separation of said elements is excessive.

The operating mechanism can have an auxiliary actuating means (operated for example by a hand brake). This actuating means would force one of the elements away from the strut.

Embodiments of the invention will now be described, by way of example, with reference to the accompanying drawings.

THE DRAWINGS

Figure 2:
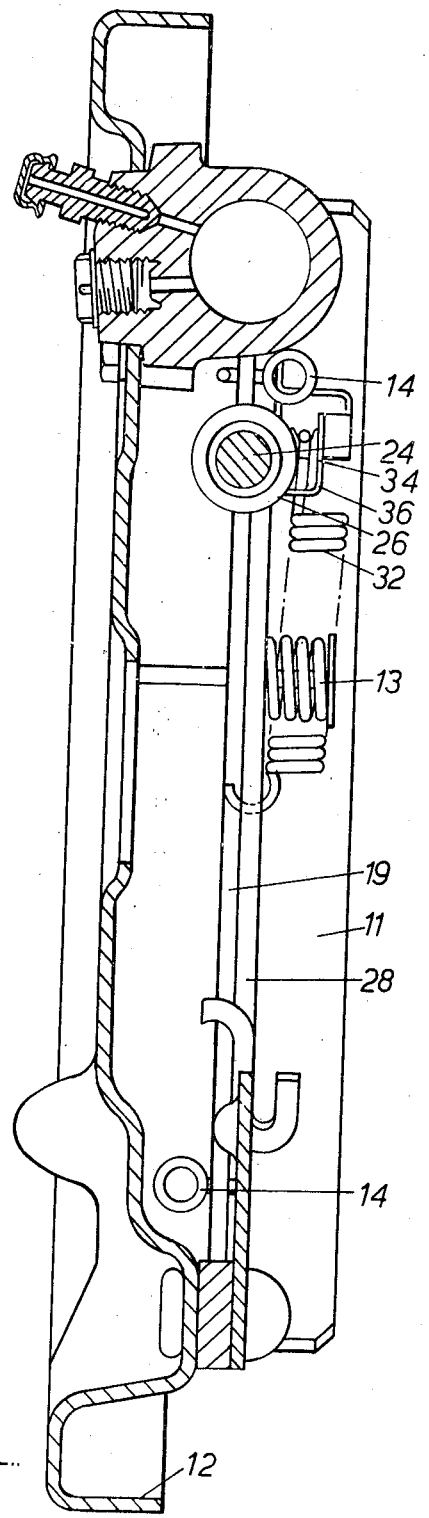
Figure 3:
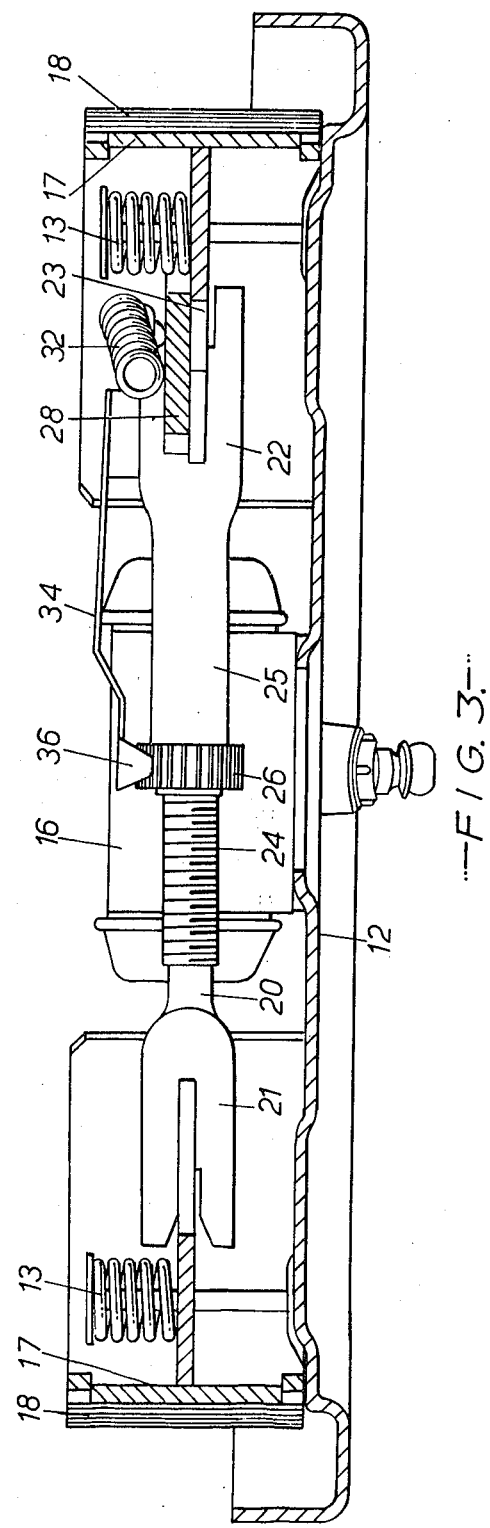
Figure 4:
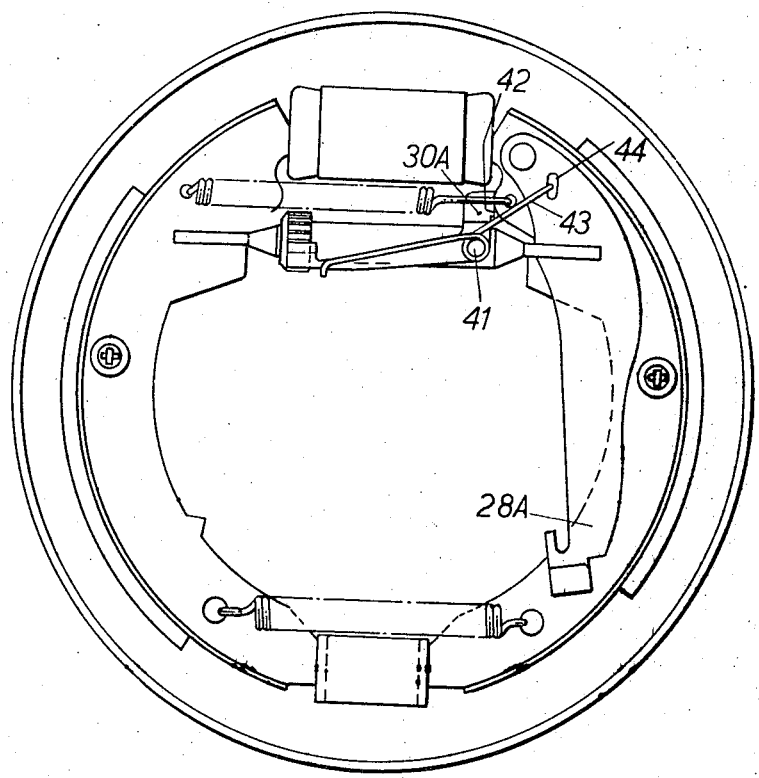
Figure 5:
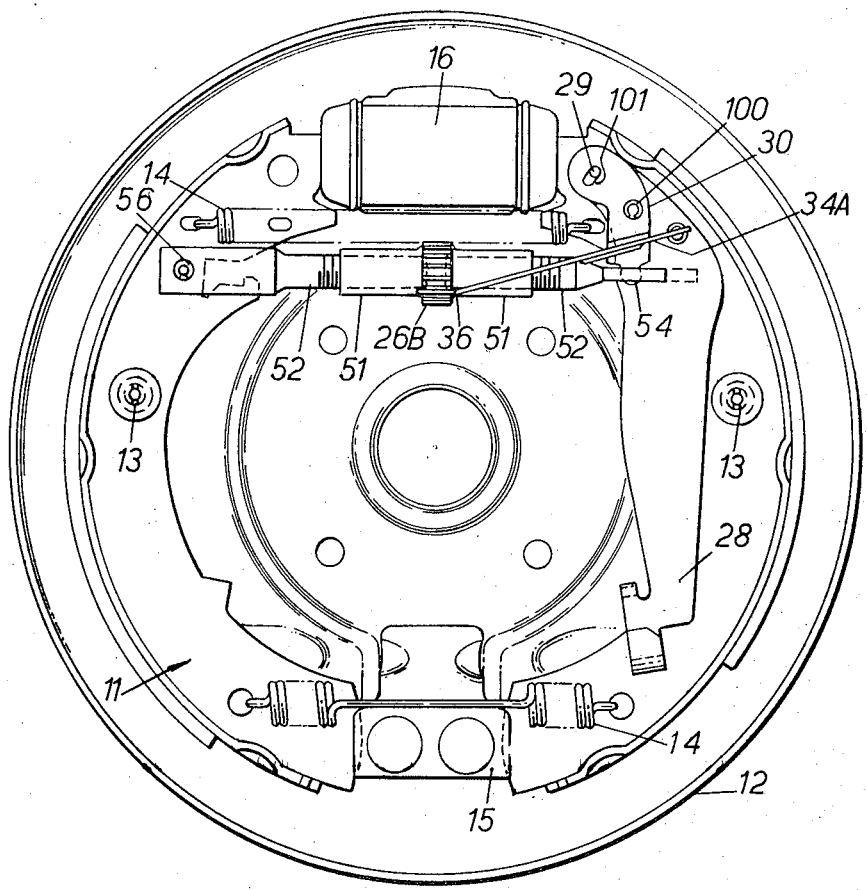

FIG. 1 is a face view of an operating mechanism for a drum brake,
FIG. 2 is a section taken along line A—A of FIG. 1,
FIG. 3 is a section taken along line B—B of FIG. 1,
FIG. 4 is a face view of a second embodiment, and
FIG. 5 is a face view of a third embodiment.

FIG. 1 is a face view of an operating mechanism for a drum brake. It shows a pair of arcuate friction elements or brake shoes 11 mounted from a backing plate 12 by means of hold down spring assemblies 13 and biassed radially inwardly towards each other by means of pull-off springs 14. The two friction elements are spaced apart at their lower ends by a torque absorbing means 15 with an actuator 16 between their upper ends.

The friction elements 11 are of conventional "T" section with a carrier platform 17 bearing a friction lining 18 and a web 19.

A strut 20 is disposed between the two elements to establish a controlled spacing therebetween, the elements being free to move outwardly but not to move inwardly to less than said controlled spacing, and has bifurcated ends 21 and 22 which engage over the webs and are located by means of suitable cut outs 23 in the webs. The strut conveniently is of tubular telescopic construction having a male threaded part 24 slidable in a tubular part 25. An internally threaded ratchet wheel 26 engages with the threaded part 24 and also abuts the end of the tubular part 25. The ratchet wheel is of such sense as to elongate the strut on the intended one-way rotation of the ratchet wheel.

An auxiliary brake actuating means is provided. This acts on a lever 28 attached to the web of one of the friction elements by means of a pivot 29 at the actuator end of said one of the elements which is preferably the trailing element (on the right hand side of FIG. 1). This lever lies on top of the web in the bifurcating slot in the end 22 in such a way that only the lever engages the end of the strut. When the lever is pulled to the left in FIG. 1 by means of a suitable brake cable, for example, it will push the pivot 29 to the right of FIG. 1 and the strut to the left. This will urge the friction elements apart.

A rocker arm 30 is pivotal to the lever 28 about a roll-pin pivot 100. The upper end of this rocker arm has a slot 101 which fits over the pivot 29 and limits the movement of the rocker arm. The lower end of the rocker arm abuts against the end of the strut so that the rocker arm is also pivotal with respect to the strut. The rocker arm is held in abutment with the end of the strut by means of a spring 32 whose other end is anchored to the lever 28. Thus the position of the rocker arm is located axially of the strut with respect to the strut.

An arm 34 is attached to, or extends integrally from, the rocker arm and carries a pawl 36 for engagement with the ratchet wheel.

When the strut has an axial compressive load exerted on it by the pull-off springs or by the auxiliary actuating means, friction will prevent any movement of the ratchet wheel. However on operation of the actuator, the only compressive stress in the strut is due to the spring 32 which urges the strut to the left of FIG. 1 so there is no clearance between the strut and the web of the left hand element. The pivot 29 and the upper end of the lever 28 move to the right of FIG. 1, whilst the spring 32 holds the lower end of the rocker arm against the strut. The rocker arm will pivot therefore about the pivot 100 carrying with it the pawl carrying arm 34 which will cause the strut to extend by rotating the ratchet wheel whilst the brake is being applied.

The pawl carried by the arm 34 has a degree of movement corresponding to one tooth pitch of the ratchet wheel before it rotates the ratchet wheel. This ensures a minimum running clearance. When the friction elements return, the rocker arm again pivots about the pivot 100 but in the reverse direction so as to return the pawl to below the strut as seen in FIG. 1.

It will be noted that operation of the auxiliary actuating means does not appreciably increase the tension in spring 32.

The construction shown in FIG. 4 is very similar to the embodiment of FIG. 1 to 3 except that the lower end of the rocker arm 30A is pivoted to the strut by means of a pin 41 and the upper end of the rocker arm has an abutment 42 which bears against the friction element. In this embodiment a torsion spring 43 is used in place of the tension spring to bias the pawl-carrying arm. A slot 44 is provided in the lever 28A above the strut so that an end of the spring 43 can be anchored but free to slide therein. Operation of the auxiliary actuating means does not substantially increase the load on the pawl carrying arm.

The embodiment of FIG. 5 differs in two important respects. The first important difference is the construction of the strut; the ratchet wheel 26B has a plain cylindrical projection 51 on each axial end and is internally threaded with oppositely handed threads at each end which engage on correspondingly oppositely handed threads on cooperating other parts 52 of the strut. The second important difference is the construction of the rocker arm. In FIG. 5 the rocker arm is pivoted as before to the pivot 100 but at its lower end has a spherical projection 54 which positively engages in a suitable hole in the end of the strut (so avoiding the necessity for a bias spring) and the pawl carrying arm 34A is a resilient member movable by the rocker arm. It is desirable to secure the left hand end of the strut to the web of the left hand friction element by for example, a pin 56. When the actuator moves the pivot 100 to the right, the rocker arm will move the pawl carrying arm 34A and cause it to rotate the ratchet wheel. The free running clearance is regulated by the pitch of the ratchet teeth and the screw threads.

The construction of FIG. 5 simplifies sealing against corrosion. The threads on the strut can be protected by rubber seals bridging between the cylindrical projections of the ratchet wheel and the parts 52, and the actuator can of course also be sealed so protecting all the fine moving part of the brake operating mechanism. In addition the pawl actuating spring has been dispensed with in favor of a more positive drive to the pawl and so the changes of frictional forces with temperature and other conditions will not effect operation of the brake adjustment.

It will be apparent that the use of the pin 56, of the turnbuckle construction of the strut, and of a positively located projection of the rocker arm (instead of a spring), are independent variations which can be used individually or in combination in either of the first two embodiments. With positive actuation of the rocker arm by a projection such as projection 54, it is preferred to have a resilient arm however. In all the embodiments the strut follows the movement of one friction element, the left hand or leading element, and one end of the rocker arm moves with the strut and the other end moves with the trailing shoe so the full relative movement is developed across the rocker arm.

I claim:

1. An operating mechanism for a mechanical coupling such as an internal shoe drum brake comprising
   a. a mounting,
   b. a pair of opposed arcuate friction elements carried from said mounting,
   c. means for biassing the friction elements radially inwardly towards each other,
   d. a torque absorbing means on said mounting and disposed between one pair of adjoining ends of the friction elements,
   e. an actuator on said mounting and disposed between the other pair of adjoining ends of the friction elements,
   f. a strut disposed between the two elements to establish a controlled spacing between the elements, said strut comprising screw engaged parts, one of which has a ratchet wheel rotating means so arranged as to cause elongation of said strut,
   g. a rocker arm having one end pivotally engaged with the strut substantially along its horizontal axis and the other end pivotally engaged with the second of said elements, and
   h. an arm movable by said rocker arm and carrying a pawl for engagement with the ratchet wheel so arranged as to cause rotation of the ratchet wheel when the actuator is operated and the separation of said elements is excessive.

2. A mechanism according to claim 1 wherein said one end of the said rocker arm is held by a spring in abutment with the end of the strut, the abutment permitting pivotal movement.

3. A mechanism according to claim 2 wherein the strut is urged against the leading friction element by said spring.

4. A mechanism according to claim 1 wherein the said rocker arm is connected by a pivot pin to the strut and is held by a spring in abutment with the said one element, the abutment permitting pivotal movement.

5. A mechanism according to claim 1 wherein said one end of the rocker arm has a projection which fits in a recess in the strut and is positively located thereby axially of the strut.

6. A mechanism according to claim 1 wherein said one element includes a member operated by auxiliary actuating means to push said strut and said element apart whereby to actuate the coupling.

7. A mechanism according to claim 6 wherein said member is a lever pivotal on a web of said one friction element and displaceable by the auxiliary actuating means to increase the effective radial depth of said web.

8. A mechanism according to claim 7 wherein the rocker arm is pivotal on the lever.

9. A mechanism according to claim 1 wherein the strut comprises a male threaded part slidable in a tubular part and with an internally threaded ratchet wheel threadedly engaged with said male threaded part and abutting the tubular part.

10. A mechanism according to claim 1 wherein the strut comprises two oppositely threaded male parts and a cooperating ratchet wheel part which is oppositely threaded at its axial ends.

11. A mechanism according to claim 1 wherein the strut slidably engages said one element but is pinned to the other.

12. A mechanism according to claim 1 wherein the pawl carrying arm is abutted by said rocker arm for causing the movement of the pawl carrying arm.

13. A mechanism according to claim 1 wherein the pawl carrying arm is rigid with the rocker arm.

14. A mechanism according to claim 1 wherein the pawl carrying arm is resilient.

15. A mechanism according to claim 10 having boot-like sealing means disposed to exclude dirt from the threads on said male parts and ratchet wheel part.

* * * * *

UNITED STATES PATENT OFFICE
CERTIFICATE OF CORRECTION

Patent No. 3,717,227          Dated February 20, 1973

Inventor(s) Heinrich Bernhard Rath, et al.

It is certified that error appears in the above-identified patent and that said Letters Patent are hereby corrected as shown below:

On the cover sheet item "[75]" should read as follows:

-- [75] Inventors: Heinrich Bernhard Rath, Koblenz-Lutzel; Manfred Kaub, Rhens/Rein; Hermann Brix, Koblenz, Germany --.

Signed and sealed this 26th day of March 1974.

(SEAL)
Attest:

EDWARD M. FLETCHER, JR.
Attesting Officer

C. MARSHALL DANN
Commissioner of Patents